US007068726B1

(12) United States Patent
Zortea

(10) Patent No.: US 7,068,726 B1
(45) Date of Patent: Jun. 27, 2006

(54) NEAR END CROSS-TALK AND ECHO AVOIDER FOR BI-DIRECTIONAL DIGITAL COMMUNICATIONS

(75) Inventor: Anthony Eugene Zortea, Pipersville, PA (US)

(73) Assignee: 3Com Corporation, Marlborough, MA (US)

(*) Notice: Subject to any disclaimer, the term of this patent is extended or adjusted under 35 U.S.C. 154(b) by 795 days.

(21) Appl. No.: 09/942,820

(22) Filed: Aug. 30, 2001

(51) Int. Cl.
*H04B 15/00* (2006.01)

(52) U.S. Cl. .................. 375/285; 375/354; 375/358
(58) Field of Classification Search ............... 375/354, 375/355, 358, 359, 362, 371, 375
See application file for complete search history.

(56) References Cited

U.S. PATENT DOCUMENTS

| | | | | |
|---|---|---|---|---|
| 4,218,771 A | * | 8/1980 | Hogge, Jr. | 375/376 |
| 5,864,592 A | * | 1/1999 | Itri | 375/375 |
| 6,265,902 B1 | * | 7/2001 | Klemmer et al. | 327/2 |
| 6,307,868 B1 | * | 10/2001 | Rakib et al. | 370/485 |
| 6,316,966 B1 | * | 11/2001 | Chang et al. | 327/2 |
| 6,377,640 B1 | * | 4/2002 | Trans | 375/354 |

OTHER PUBLICATIONS

"Understanding Subscriber Line Technology" T. Starr, J. Cioffi and P. Silverman ISBN 0-13-780545-4 Ed. 1999 Prentice Hall PTR pp. 86-92.*
"DSL simulation Techniques and Standards Development for Digital Subscriber line Systems" W. Chen ISBN 1-57870-017-7 Macmillan Technical Publishing 1998 pp. 60-67.*

* cited by examiner

*Primary Examiner*—Kevin Burd
*Assistant Examiner*—Juan Alberto Torres
(74) *Attorney, Agent, or Firm*—Richard A. Baker, Jr.

(57) ABSTRACT

A bi-directional communication link has plural channels with respective masters and slaves at respective ends of respective channels, in which each master issues a Master Tx clock, each slave constructs a Slave Rx clock frequency locked to the Master Tx clock, and a Slave Tx clock frequency locked to the Slave Rx clock. A metric processor for each master produces a metric signal indicative of resolution of a signal received by the master from the corresponding slave. A decision processor responsive to the metric processor changes the phase of the Slave Tx clock relative to the Slave Rx clock so as to maximize the metric signal. In one embodiment, the resolution is a resolution between leading and trailing edges of the received signal. In another embodiment, the resolution is a resolution between allowed amplitude levels of the received signal.

11 Claims, 8 Drawing Sheets

NEAR END CROSS-TALK AND ECHO AVOIDER FOR BI-DIRECTIONAL DIGITAL COMMUNICATIONS

BACKGROUND OF THE INVENTION

1. Technical Field

The invention is related to digital communication devices that both transmit and receive, such as a computer modulator-demodulator (modem) or a network interface circuit for a personal computer, and more specifically to the reduction of near-end cross-talk and echo in such devices.

2. Background Art

A digital communication device useful, for example, in linking a personal computer to a local area network typically must be able to transmit data as well as receive data. In a local area network, the communication device is part of a network interface card of the personal computer, the network being formed by multi-conductor cables connected between the network interface cards of the different personal computers in the network. Typically, a network interface card transmits communications on one set of pins or conductors of the multi-conductor cable while receiving communications on another set of pins of the cable. However, due to mutual coupling between the different conductors of the cable, the signal transmitted by the transmitter portion of the network interface card (the "near end") may be sensed by the receiver portion of the network interface card along with a signal received from another computer in the network (at the "far end"). This causes interference and is often referred to as near end cross-talk because some portion of the near end transmitter is coupled into the near end receiver. Mutual coupling from the near end transmitter of an adjacent channel is referred to as "near end cross-talk" while reflections from near end transmitter of the same channel is referred to as "echo". Ideally, only the far end transmitter is seen at the near end receiver. Near end cross-talk and echo can disrupt communications by making it difficult or impossible for the receiver to discriminate the received signal from noise produced by cross-talk and echo from the near end transmitters.

Such cross-talk and echo can be reduced by cancellation. The version of the near end transmitted signal that is actually coupled to the receiver is approximately determined, and its approximate inverse is generated accordingly and applied to the receiver's input as a correction signal. However, it is not possible to predict what portion, if any, of the near end transmitted signal will be coupled to the receiver at any given moment and therefore it is not possible to predict what the correction signal should be. However, the correction signal can be derived using feedback to evaluate the errors of successive attempts and improve the correction signal. For example, well-known gradient descent methods and the like can be employed. Due to the nature of the mutual coupling that causes near end cross-talk, the correction signal may have to include a number of components of the transmitted signal each with a different time delay and a different amplitude, but with a relatively fixed bandpass filter. The delays and amplitudes tend to change over time due to the random nature of the near end cross-talk. Thus, near end cross-talk and echo cancellation is a relatively complex process and requires a significant amount of circuitry on the integrated circuit controlling the network interface.

In the Gigabit Ethernet standard link, there are four separate bi-directional communication channels, each channel having both a transmitter and a receiver at each one of its two ends. At one end of the link (e.g., the near end), therefore, there are four receivers and four transmitters. Each of the four receivers must have a cross-talk or echo canceller for each of the four near end transmitters, yielding sixteen cancellers in all. This represents a great burden in terms of circuit complexity on the integrated circuit, representing a potential trade-off in cost and reliability, a significant problem.

SUMMARY OF THE INVENTION

A bi-directional communication link having plural channels with respective masters and slaves at respective ends of respective channels, each master issuing a Master Tx clock, each slave constructing a Slave Rx clock frequency-locked to the Master Tx clock, and a Slave Tx clock frequency-locked to the Slave Rx clock, wherein the master samples a signal it receives from the slave at a sample time Ts frequency locked to the Master Rx clock, and wherein each master receives a combination of signal and noise, the noise comprising cross-talk from masters of adjacent channels and echoes of itself; the noise capable of reducing the resolution of a signal received by the master from the slave over the corresponding communication. The bi-directional communication link includes a metric processor for each master that produces a metric signal indicative of the resolution of the signal received by the master from the corresponding slave. A decision processor responsive to the metric processor shifts the sample time Ts relative to the Master Tx clock so as to reduce the effects of the noise burst on the received signal and thereby increase the metric signal.

In one embodiment, the metric signal reflects a time difference between leading and trailing edges of the received signal, i.e. a "separation distance". In this case, the metric processor computes an opening in an eye diagram of the signal received by the master. In another embodiment, the metric signal reflects amplitude differences between the received signal and allowed amplitude levels of the received signal. In this latter case, the metric processor computes the proportion of samples of the signal received by the master falling within allowed amplitude levels relative to those that fall outside of allowed amplitude levels.

The link may further include a controllable delay between the Slave Rx clock and the Slave Tx clock, the decision processor governing the controllable delay so as to shift the sample time Ts.

BRIEF DESCRIPTION OF THE DRAWINGS

FIGS. 3D–3K illustrate clock signals employed in the embodiment of FIG. 1.

DETAILED DESCRIPTION OF THE PREFERRED EMBODIMENTS

Figure 1:
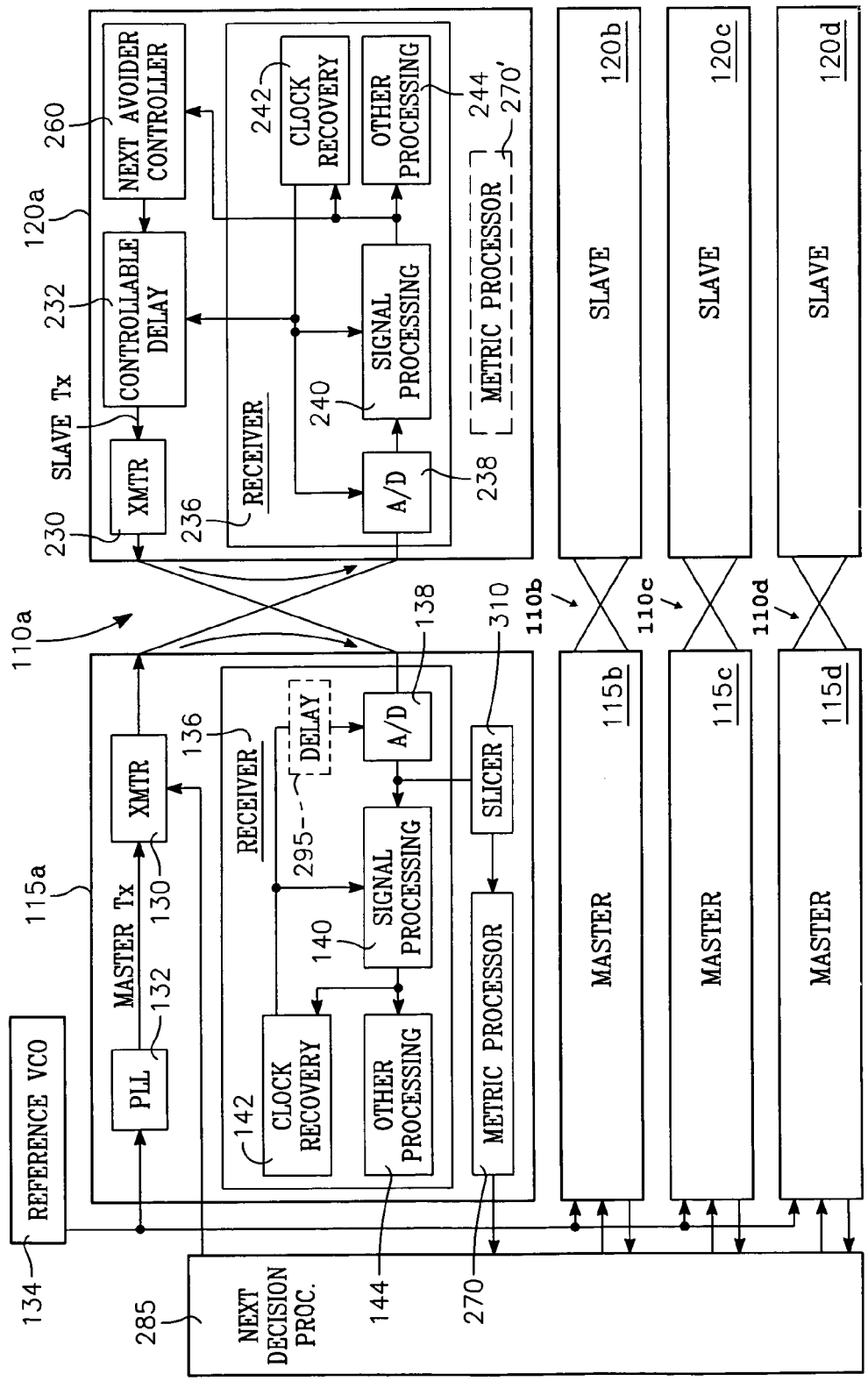
FIG. 1 is a simplified schematic diagram illustrating a preferred embodiment of the invention.

FIG. 1 depicts a digital communication link having four independent channels 110a–110d, each of the channels 110a–110d being connected at their near ends to respective masters 115a–115d and at their far ends to respective slaves 120a–120d. Each of the channels 110a–110d may be a coaxial cable, for example.

The master 115a is typical of all the masters 115a–115d, and includes a transmitter 130 that receives a Master Tx clock signal from a phase lock loop (PLL) 132. A reference voltage controlled oscillator (VCO) 134 controls the phase lock loop 132 in each of the masters 115a–115d. The output of the transmitter 130 is connected to the near end of the channel 110a. The master 115a further includes a receiver 136 having its input connected to the near end of the channel 110a. The receiver 136 includes an analog-to-digital (A/D) converter 138 with its input constituting the receiver input, a signal processor 140 connected to the output of the A/D converter 138, and a clock recovery circuit 142. The clock recovery circuit 142 generates a Master Rx clock from the output of the signal processor 140, the Master Rx clock signal controlling the signal processor 140 and the analog-to-digital converter 138. The signal processor 140 performs functions required by the clock recovery circuit 142, for example, such as peak detection. Other signal processing, such correction for example, may be performed by a down-stream signal processor 144.

The slave 120a is typical of all the slaves 120a–120d, and includes a transmitter 230 that receives a Slave Tx clock signal from a delay element 232. The output of the transmitter 230 is connected to the far end of the channel 110a. The slave 120a further includes a receiver 236 having its input connected to the far end of the channel 110a. The receiver 236 includes an analog-to-digital (A/D) converter 238 with its input constituting the receiver input, a signal processor 240 connected to the output of the A/D converter 238, and a clock recovery circuit 242. The clock recovery circuit 242 generates a Slave Rx clock from the output of the signal processor 240, the Slave Rx clock signal controlling the signal processor 240 and the analog-to-digital converter 238. The signal processor 240 performs functions required by the clock recovery circuit 242, for example, such as peak detection. Other signal processing, such a error correction for example, may be performed by a down-stream signal processor 244.

In Master/Slave clock type communications systems such as that illustrated in FIG. 1, the master, such as the master 115a, arbitrarily establishes the frequency and phase of its transmitter 130 within certain pre-established bounds. The corresponding slave 120a recovers this clock at its receiver 236 as the Slave Rx clock and uses it for two purposes: (a) to recover data and (b) to generate the Slave Tx clock for the slave transmitter 230. The master 115a therefore sees at its receiver 136 a signal whose embedded clock is that same frequency as its own master transmitter 130. However, the phase of the signal received by the master 115a is not fixed, and is governed by the phase relationships illustrated in FIGS. 2A–2D.

Figure 2A:
FIGS. 2A–2D are timing diagrams illustrating phase relationships in the embodiment of FIG. 1.
Figure 2B:
Figure 2C:
Figure 2D:
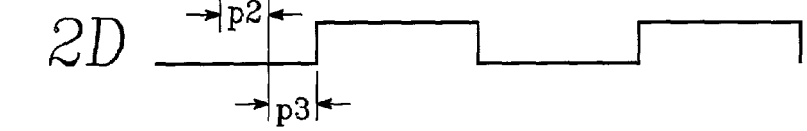

FIG. 2A illustrates the Master Tx clock signal produced in the master 115a by the phase lock loop 132 while FIG. 2B illustrates the Slave Rx clock signal produced in the slave 120a by the clock recovery circuit 242. The phase difference p1 between the Master Tx clock signal and the Slave Rx clock signal is determined by the length of the channel 110a. FIG. 2C illustrates the Slave Tx clock signal produced in the slave 120a by the delay element 232. In a conventional system, the delay element 232 is not present or is not controllable, so that the Slave Rx and Tx clocks may be at least nearly of the same phase or any other arbitrary phase. The phase delay between the Slave Rx and Tx clocks is denoted as p2 in FIG. 2C and is determined by the delay element 232 in the system of FIG. 1. FIG. 2D illustrates the Master Rx clock signal. The phase delay p3 between the Slave Tx clock and the Master Rx clock signals is determined by the length of the channel 111a.

Figure 3A:
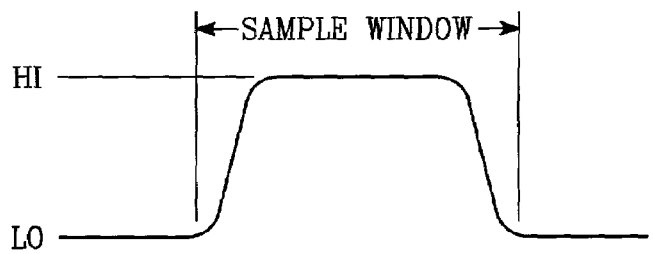
FIGS. 3A–3C illustrate the synthesis of an eye diagram for the embodiment of FIG. 1.
Figure 3B:
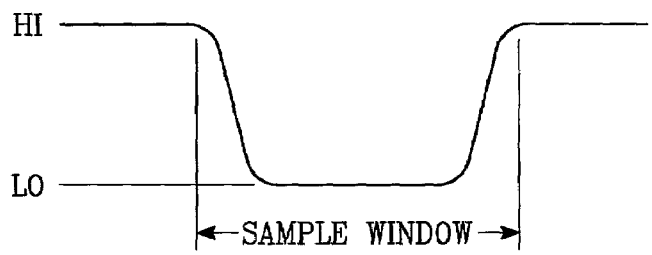
Figure 3C:
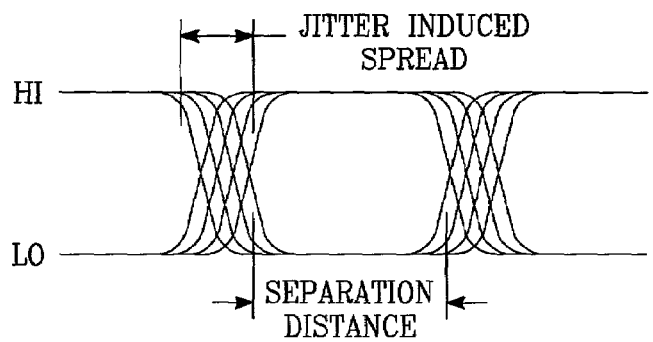

In general, an eye-diagram illustrates the separation between pulse edges of a series of successive pulses superimposed on one another in accordance with a periodic sampling rate corresponding to the pulse rate. The concept is illustrated in FIGS. 3A–3C. FIG. 3A illustrates a pulse signal captured during a sample window and consisting of a logic HI state preceded and followed by logic LO states. FIG. 3B illustrates a pulse signal captured during another sample window of the same duration consisting of a logic LO state preceded and followed by logic HI states. The two sample windows are displaced in time by an integral number of periods of the pulse signal. Superimposing the signal images captured in successive sample windows results in the waveforms of FIG. 3C. FIG. 3C is referred to as the eye diagram of the receiver. The superimposed waveform image of FIG. 3C may be thought of as an oscilloscope trace, in which the oscilloscope is triggered by a clock locked to the transmitting source generating the input signal. (However, the clock used to trigger this imaginary oscilloscope is not necessarily available).

In order for the receiver to recover the clock and data by discriminating between successive edges of the clock, there must be at least a small opening in the eye diagram. This opening is denoted "separation distance" in the eye diagram of FIG. 3C. It is the time interval which separates successive groups of superimposed rising and falling edges of the clock signal. During the interval corresponding to the opening of the eye diagram, the distinction between the allowed levels of the incoming signal is unambiguous, and therefore it is during this interval that the A/D converter 138 must sample the received signal. Otherwise, it is likely the receiver will be unable to discriminate between successive clock edges, and synchronization will be lost. Thus, the wider the eye diagram opening or separation distance, the better the receiver can perform. Unfortunately, the unambiguous nature of the signal during the opening of the eye diagram may be clouded upon the introduction of noise, such as near end cross-talk and echo.

The separation distance denoted in FIG. 3C is the minimum separation between leading and trailing edges of any of the pulses superimposed upon one another. Jitter in the received signal will cause the leading edges of different pulses to be at least slightly spread out from one another by a jitter-induced spread distance in the superimposed image or eye diagram of FIG. 3C. Such jitter-induced spread represents a diffusion of the edges and therefore a loss of resolution or degradation of the signal. The greater the jitter, the smaller the separation distance or opening between leading and trailing edges and the poorer the signal resolution. In fact, if the jitter is so severe that the separation distance is zero, there is no resolution between leading and trailing edges and the signal is lost. Therefore, the separation distance is a measure of the resolution of the signal.

Figure 4:
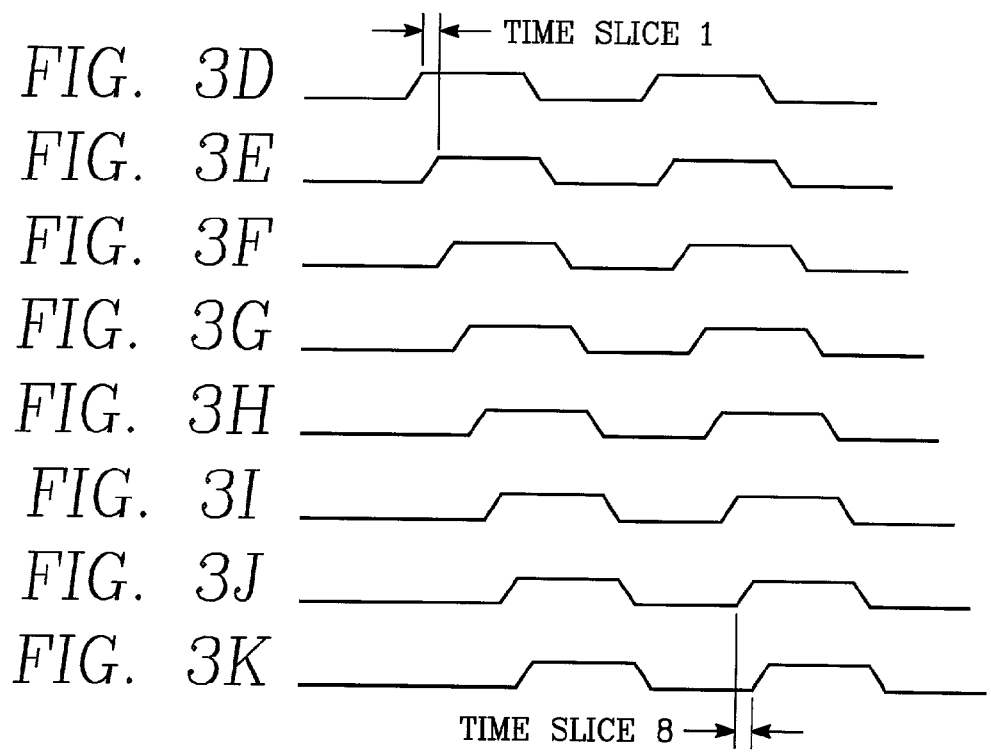
FIG. 4 illustrates an eye diagram of the embodiment of FIG. 1.
Figure 4:
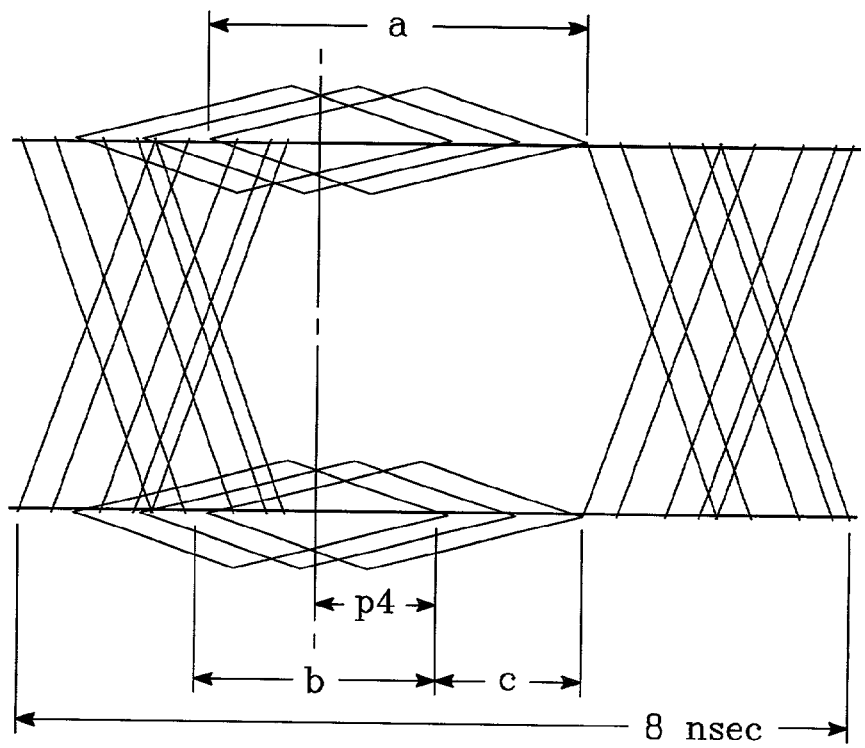

FIG. 4 illustrates the eye diagram of the receiver 136 of the master 115a in the presence of near end cross-talk from near end transmitters in the adjacent channels 110b–10d as well as echo from the near end transmitter 130 of the master 115a itself. The near end cross talk and echo noise is the perturbation in the waveform of FIG. 4 denoted "NEXT/echo". The NEXT/echo noise reduces receiver performance because it distorts the amplitude of the sample taken by the A/D converter 138 during the interval of the eye diagram separation distance. A problem arises if such noise has a large amplitude during the instant that the A/D converter 138 samples the received signal (i.e., at the sampling time Ts).

It is typical that the duration of the NEXT/echo noise is shorter than the eye diagram separation distance or opening. This is illustrated in FIG. 4, in which the interval (a) of the eye diagram opening includes a portion (b) in which the NEXT cross-talk and echo noise has a relatively high amplitude and another portion (c) in which the NEXT cross-talk and echo has a relatively low amplitude. The NEXT/echo noise occurs as the relatively short burst illustrated in FIG. 4 because typically it occurs at one or two discrete fixed points along the channel where the coaxial cable may interface with a connector, for example. The impedance change at such a juncture causes signal reflection which returns as an echo. Capacitive coupling at the connector also causes each of the cables to interfere with every other cable and is referred to as cross-talk. The transit time to such a juncture in the channel determines the position of the peak of the cross-talk and echo noise in the eye diagram of FIG. 4.

In accordance with the present invention, in cases like that of FIG. 4 in which the NEXT cross-talk and echo noise is contained within a relatively short burst, distortion caused by such noise may be greatly reduced or even completely avoided by adjusting the sampling time Ts of the A/D converter 138 relative to the occurrence of the cross-talk and echo noise burst. This adjustment is made so that the sampling time occurs during the time portion (c) of the eye diagram of FIG. 4 during which the noise burst has a very low or zero amplitude. In FIG. 4, this concept corresponds to the delay p4 of the Master Rx clock from the nominal sampling time indicated in dashed line. The nominal sampling time coincides with the peak of the cross-talk and echo noise, while the actual sampling time delayed by p4 coincides with a minimum or reduced amplitude of the cross-talk and echo noise.

The sampling time Ts of FIG. 4 is determined by the Master Rx clock signal. The Master Rx clock signal is locked to the Slave Tx clock signal with the phase delay p2 through the clock recovery circuit 142 of the master's receiver 136. Therefore, in one preferred embodiment, the sampling time Ts of the master's A/D converter 138 may be delayed to avoid the cross-talk and echo noise burst (illustrated in FIG. 4) by delaying the Slave Tx clock signal. (In an alternative embodiment, the sampling time Ts is delayed by directly controlling and delaying the Master Rx clock signal applied to the A/D converter 138 in the master 115a.)

In the preferred embodiment, delaying the Slave Tx clock signal is facilitated by providing a controllable device as the delay element 232 in the slave 120a. The controllable delay element 232 is governed by a delay (next avoider) controller 260 in the slave 120a. The delay controller 260 responds to a delay command transmitted over the channel 110a by the master 115a. The problem is how to determine the optimum delay command that best minimizes the effects of NEXT/echo noise.

This problem is solved by providing in each master 115a–115d a metric processor 270, capable of assessing the quality of the eye diagram opening illustrated in FIGS. 3C and 4 and outputting a corresponding metric. To the extent that the cross-talk and echo noise introduces ambiguity in the separation across the eye diagram opening, the metric processor will respond by reducing the metric. A decision processor 285 monitors the metric signal issued by the metric processors 270, and determines the optimum delay for the controllable delay element 232 that maximizes the metric signal. It controls the delay element controller 260 by transmitting commands over the channel 110a via the transmitter 130. The controller 260 responds to the delay command received via the channel from the decision processor 285.

Two embodiments of the metric processor 270 are described below. The decision processor 285 may simply be programmed to try every allowed delay value of the controllable delay element 232 and choose the one that results in the best metric from the metric processor 270. All this may be accomplished during a calibration period provided in the signal protocol. As the decision processor 285 tries different delay values, it sends successively different delay commands via the transmitter 130, the channel 110a and the receiver 236 to the slave's delay controller 260, until the optimum delay (yielding the highest metric) is found. The decision processor 285 then sends the optimum command (after trying the others). Thereafter, the delay is not changed until the next calibration period.

Alternative Feature of the Decision Processor 285-

Changing the Slave Tx clock phase in each slave 120a–120d does not affect the timing of the cross-talk and echo noise burst in FIG. 4, but it does shift the received signal edges relative to that burst in the receiver of each master 115a–115d. This feature has the potential of being used to shift the cross-talk/echo noise burst relative to the eye diagram opening of FIG. 4 to one side or the other. This can have the salutary effect of widening the interval within the eye diagram that is free or more nearly free of cross-talk/echo noise. Thus, for example, in the example of FIG. 4, the cross-talk/echo noise burst lies closer to the leading signal edges than the trailing signal edges (i.e., it lies mostly on the left side of the eye diagram opening). Therefore, the low noise portion c of the eye diagram opening may be enlarged by effecting a relative shift of the noise burst further to the left side of the eye diagram. (Of course, what really moves are the received signal leading and trailing edges in the eye diagram.)

In order to best profit from this feature, it may be necessary, in some cases, to shift the sampling time Ts of the A/D converter 138 relative to the received signal edges or eye diagram opening or to prevent it from shifting while effecting a relative shift between the eye diagram opening and the cross-talk/echo noise burst. For example, from the frame of reference of the eye diagram opening, the noise burst may be shifted to the left (by controlling the Slave Tx clock delay) while the sampling time Ts of the master's A/D converter 138 may shifted to the right or left in place. In order to effect such an independent shift of the sampling time Ts, a controllable delay element 295 may be provided at the Master Rx clock input to the A/D converter 138. The decision processor 285 would govern the controllable delay element 295 to realize a shift in Ts independent of the shift in the Slave Tx clock signal. Such a feature is an alternative embodiment. The description below concerns the preferred features of the invention and does not refer to the latter feature.

First Embodiment of the Metric Processor 270-

The metric processor 270, in a first embodiment, outputs a metric signal whose magnitude represents a metric corresponding to the separation distance of FIG. 3C. In this first embodiment, the metric processor 270 generates N equally spaced clocks that are derived from its local clock input. Each of these N clocks is sampled by the output of a slicer 310 of the signal processor 140, producing an N-element vector of 0's and 1's. Many, say 64, of these N-element vectors are summed, producing another N-element vector of sums or amplitudes. Then, the metric processor intelligently sorts the N cumulative amplitudes into two groups of N/2 consecutive cumulative amplitudes. There are N possible groupings, but the processor 270 selects the one grouping having the greatest contrast between the two groups. In the preferred embodiment, this contrast is the difference between the sums of the cumulative amplitudes of each group. Preferably, this difference is the metric signal produced by the metric processor 270. In an alternative embodiment, the contrast is a ratio between the sums of the cumulative amplitudes of each group, and this ratio is output as the metric signal.

Figure 5A:
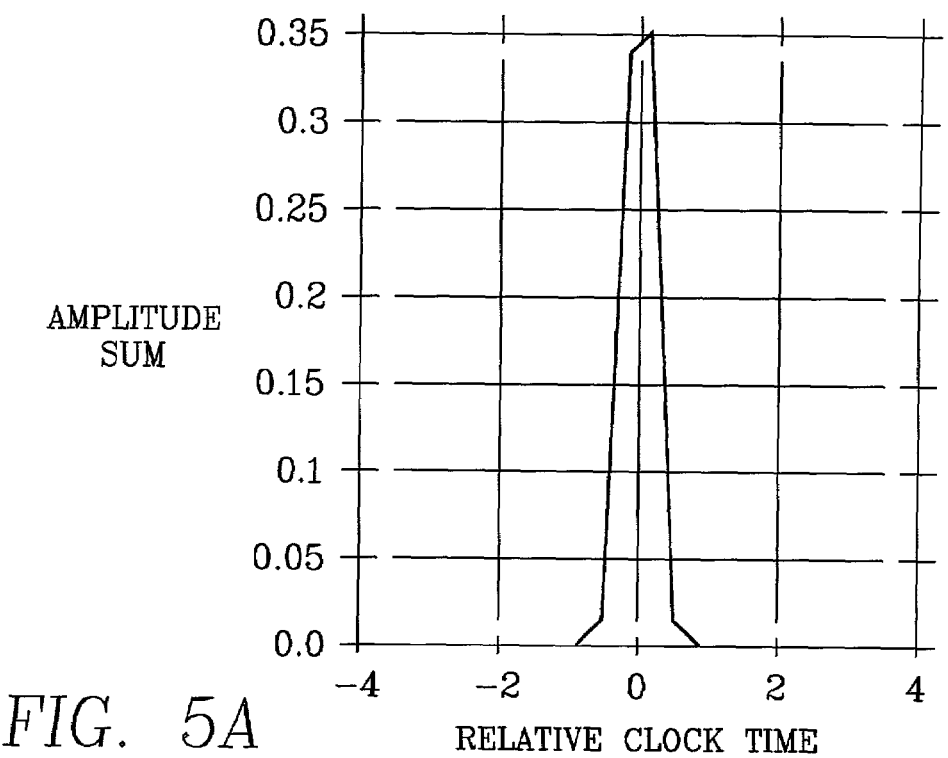
FIGS. 5A and 5B are histograms depicting the operation of a metric processor in the embodiment of FIG. 1.
Figure 5B:
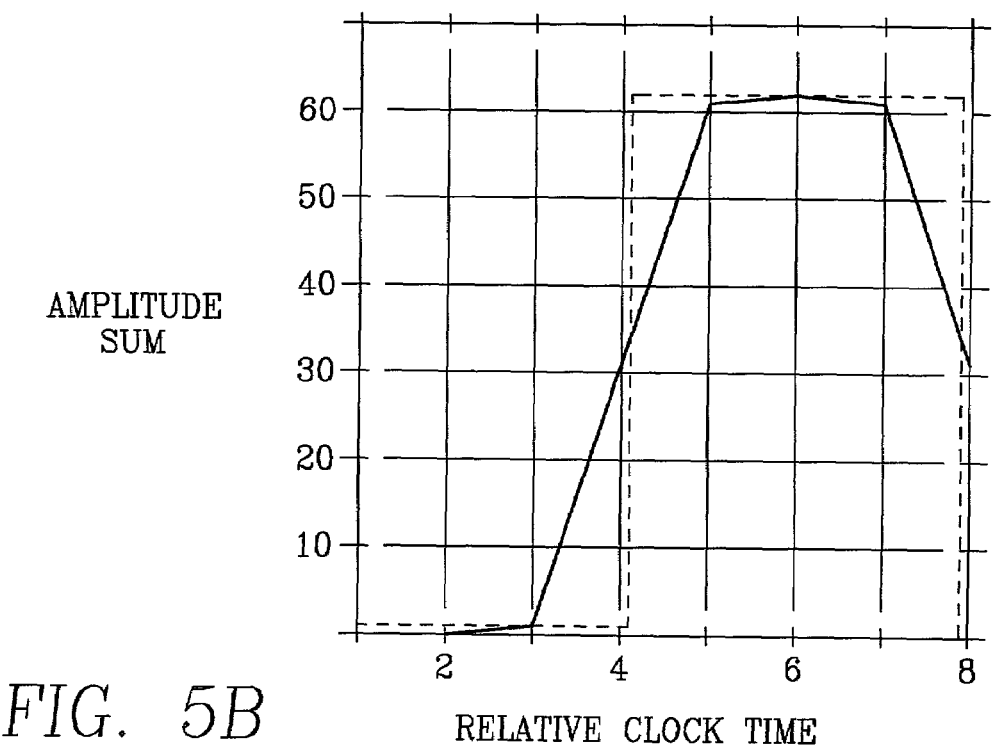

In one example, a slicer output is used to sample eight evenly shifted clock signals (so that N=8) as illustrated in FIGS. 3D–3K. Sixty-four of these 8-element sample vectors are summed to produce eight cumulative amplitudes. These cumulative amplitudes may be plotted as a histogram of amplitudes, as in FIG. 5A. In the example of FIG. 5A, the received signal has relatively little jitter, so that successive edges are closely grouped around a common sample time (0), with about 35% of the edges occurring at time 0. FIG. 5B illustrates the cumulative sums plotted as a function of the clock positions in an example in which the eight cumulative sums were as follows:

{0, 0, 0, 1, 32, 62, 64, 32} where a logic HI amplitude is 1 and a logic LO amplitude is 0. A corresponding plot in the case of a signal having zero jitter is shown in dashed line in FIG. 5B, in which case the cumulative sums would be as follows:

{0, 0, 0, 0, 64, 64, 64, 64}

In the first example, the metric is 189 while in the second example the metric is 256, indicating a much wider separation distance in the superimposed image of FIG. 3C and therefore better signal quality.

Figure 6:
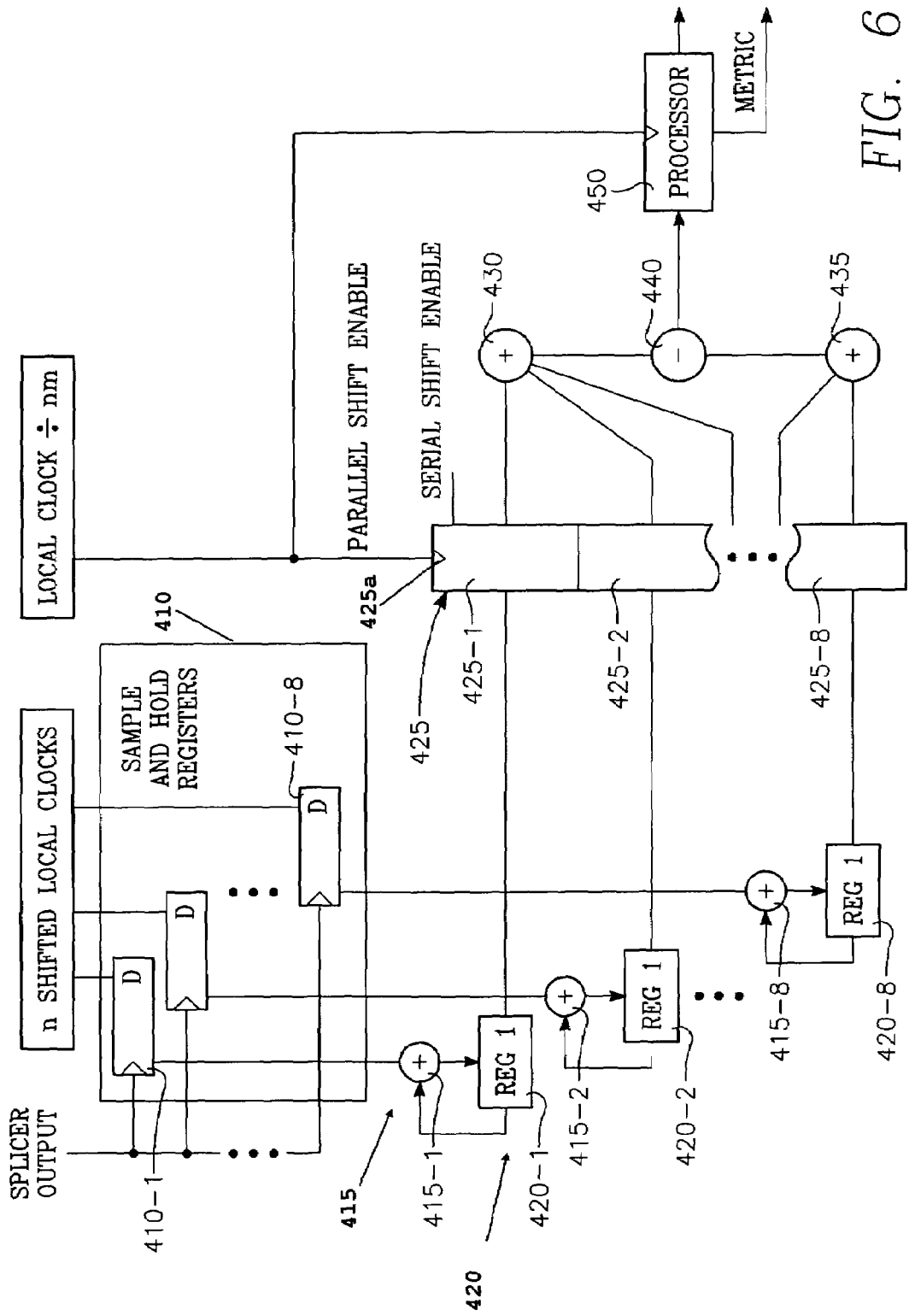
FIG. 6 illustrates an embodiment of a metric processor employed in the embodiment of FIG. 1.

FIG. 6 illustrates an embodiment of the metric processor 270. The output of a slicer is applied in parallel to the clock input of N D-flip-flops (DFF)410-1 through 410-8. Each DFF 410 samples its respective version of the shifted local clock at the edge of the slicer output. In the example of FIG. 6, N=8. The output of DFF 410 is applied to one input of a corresponding adder in adders 415, the latter containing adders 415-1 through 415-8. The output of the adders 415 is applied to an accumulate register 420, formed individual registers 420-1 through 420-8 whose output is fed back to the other input of the adders 415. After an appropriate number (M) of slicer output edges, each accumulate register 415 holds a fairly large sum. At this time, therefore, all of the accumulate registers 415 write their contents to corresponding word locations in a serial-parallel shift register 425.

The serial-parallel shift register 425 is divided into word cells 425-1 through 425-8, each word cell receiving the output of a corresponding one of the accumulate registers 420 at the end of M sample windows. For this purpose, the parallel shift enable input 425a of the serial-parallel shift register 425 is strobed with a version of the local clock signal with frequency divided by N times M. After the N cumulative amplitudes are loaded into corresponding word cells 425-1 through 425-8, the contents of the shift register 425 are serially shifted word-by-word. With each shift, adders 430 and 435 compute the sums of the contents of respective halves of the shift register 425, and a subtractor 440 computes the difference between the two sums. A processor 450 stores each difference. After N serial shifts of the shift register 425, all possible groupings of the cumulative amplitudes have been made, and therefore the processor 450 chooses the largest difference and outputs that as the metric. The advantage is that no information is required regarding the location of the edges with respect to the N-shifted local clocks in order to obtain the correct grouping of the cumulative amplitudes.

Figure 7:
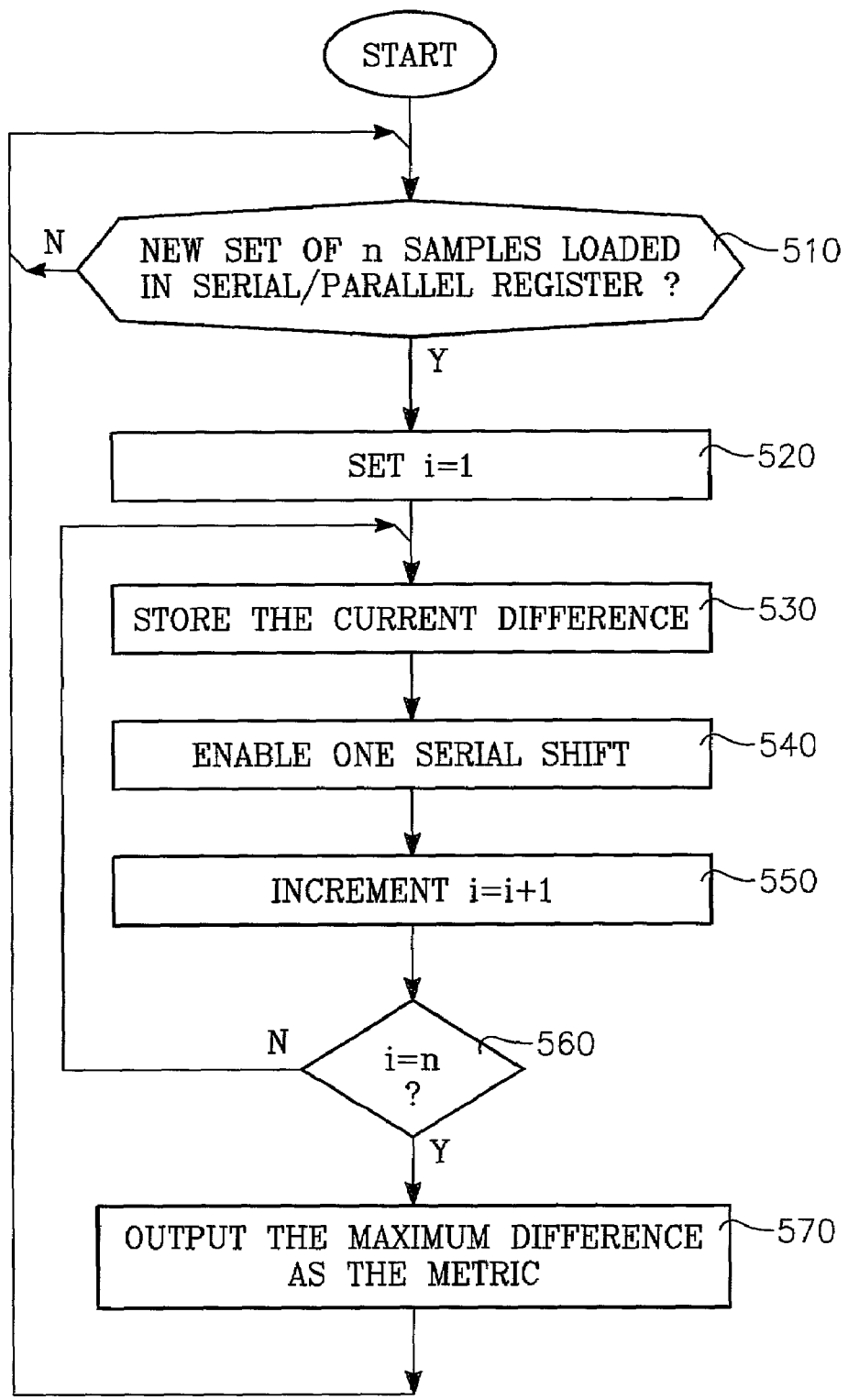
FIG. 7 is a flow diagram illustrating the operation of the processor of FIG. 6.

FIG. 7 illustrates the operation that the processor 450 is programmed (or hardwired) to carry out. After M slicer output edges, N new cumulative amplitudes have been loaded into the N respective word cells 425-1 through 425-8 of the serial-parallel shift register (block 510 of FIG. 7), an index i is initialized at 1 (block 520 of FIG. 7) and the difference now appearing at the output of the subtractor 440 is stored (block 530). Then, the serial-parallel shift register 425 is serially shifted by one word cell (block 540) and the index i is incremented (block 550). If the index i has not reached N (NO branch of block 560) the process is repeated beginning at block 530. Otherwise, i=N (YES branch of block 560), and there are N differences corresponding to the N serial shifts of the register 425, in which case the processor 450 chooses the largest difference and outputs that as the metric (block 570).

Second Embodiment of the Metric Processor 270-

Figure 8:
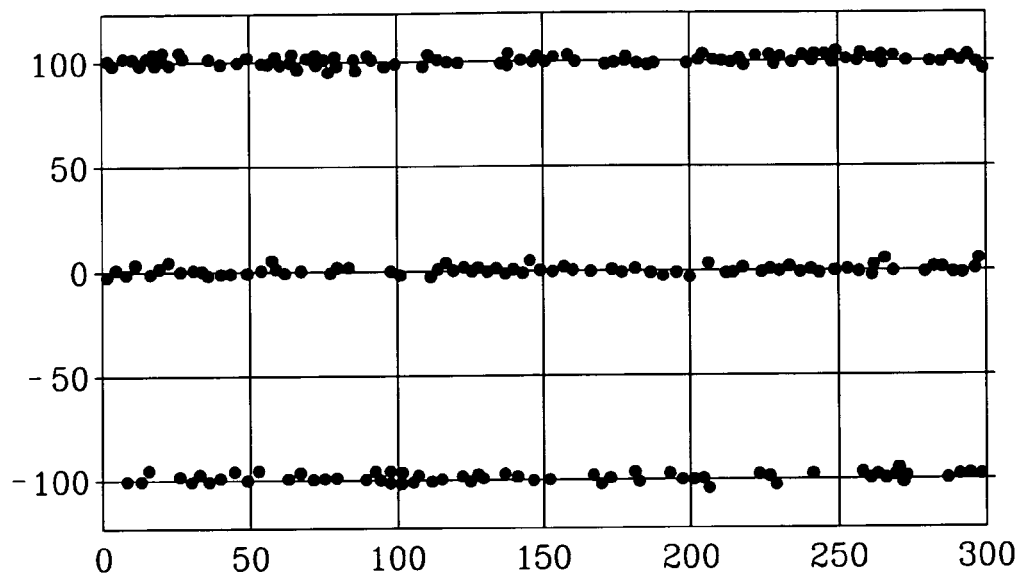
FIG. 8 is a histogram of samples of a received 3-level signal in the absence of noise.
Figure 9:
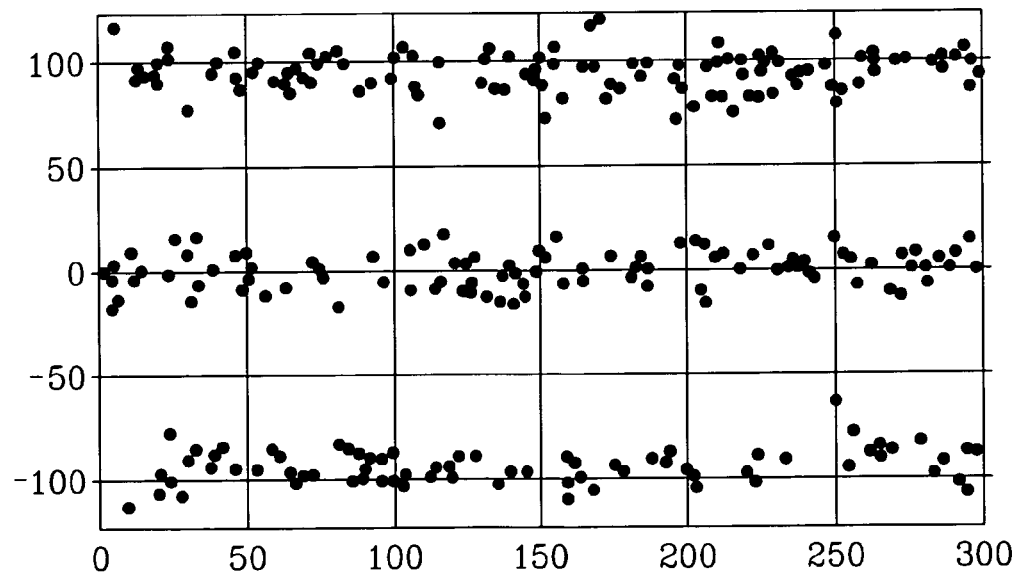
FIG. 9 is a histogram of a received 3-level signal in the presence of noise.

A second embodiment of the metric processor is best understood by first referring to the concepts illustrated in FIGS. 8 and 9. The metric processor 270 of this second embodiment is described with reference to an example in which the received signal amplitude has three allowed levels, although the processor may be constructed to work with any number of allowed levels of two or more. FIG. 8 illustrates a histogram of received samples of a three-level pulse amplitude modulated signal with no distortion. The three signal levels are given as percentages of peak amplitude, specifically 100, 0 and –100. In FIG. 1, each signal sample falls exactly on one of the three allowed signal levels.

FIG. 9 illustrates a histogram of received signal of the same signal in the presence of distortion attributable to the reactance of a long (150 meter) coaxial cable over which the signal was received. FIG. 9 shows that the samples tend to cluster around the three allowed levels, but some of the samples deviate as much as 25% from the nearest allowed level. A 50% deviation is completely anomalous, since at that deviation the sample is equidistant from two allowed levels and therefore it is not known which level is the true level that was transmitted. To avoid such a failure, equalization is necessary to reduce the deviation of the sample population and gain a tighter distribution closer to the ideal case of FIG. 8.

Figure 10:
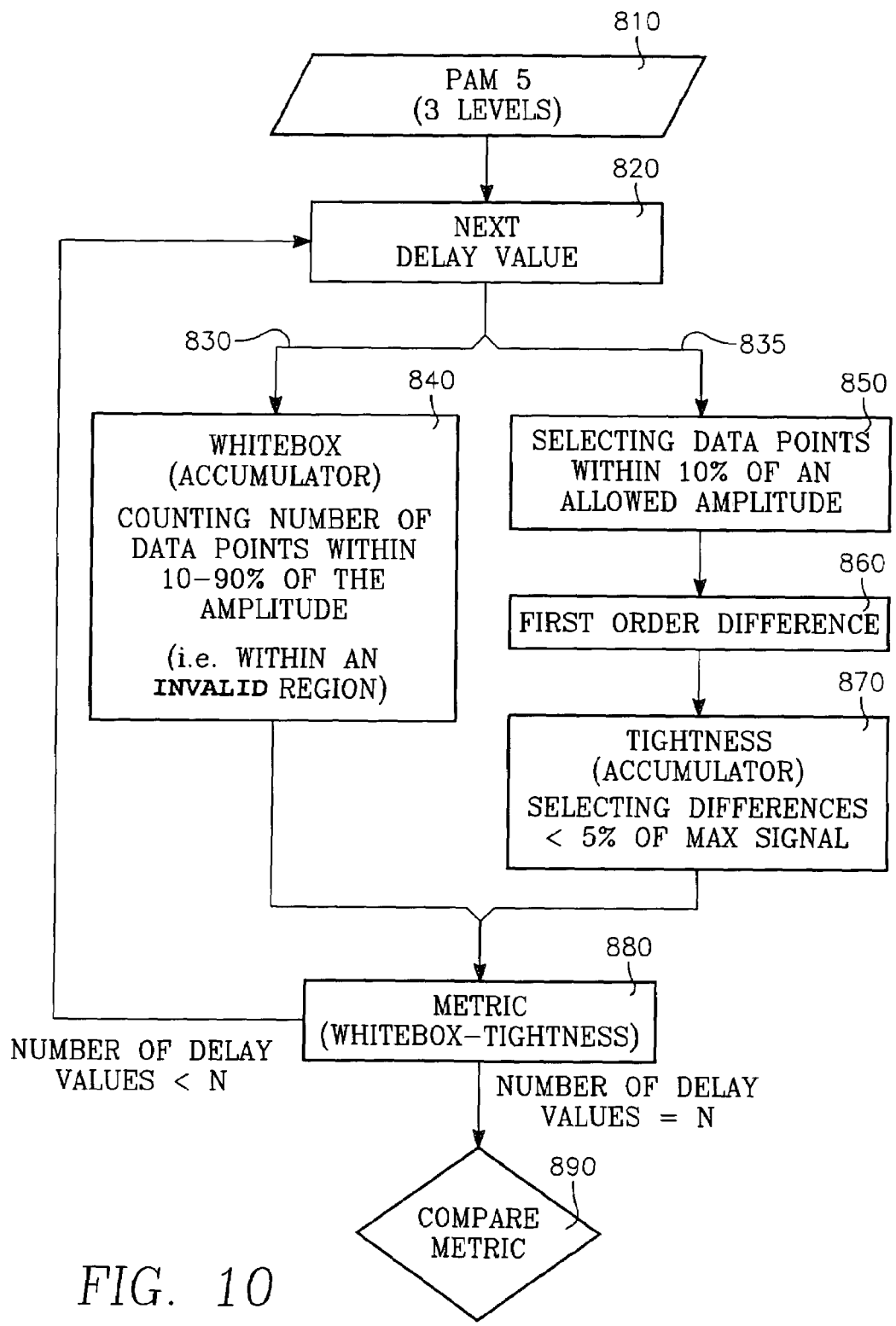
FIG. 10 is a flow diagram illustrating an alternative method for computing a metric in lieu of the metric processor of FIGS. 6 and 7.

Referring to FIG. 9, it is seen that a fairly large fraction of the samples deviate more than 10% from the nearest allowed level of 100, 0 or –100. Thus, one practical choice for the metric, a so-called "white-box" metric, is to define one of the invalid regions as lying between 10 and 90 and the other as lying between −10 and −90. In this case, a practical criteria for a metric based on tightness (i.e. a so-called "tightness" metric) is to define all first order differences that are 5 or less as satisfying the tightness criteria. FIG. 10 illustrates how these choices would be carried out in implementing an embodiment of the invention.

Referring to FIG. 10, a stream of 3-level pulse amplitude modulated signal samples is received and their peak positive and peak negative amplitudes are detected to determine the actual amplitudes of the three levels (block 810 of FIG. 10). The controllable delay element 232 (having a number (N) of selectable delay values) is set to the "next" delay value in a predetermined sequence of delay values (block 820). The process then proceeds along two parallel branches 830, 835. In branch 830, the white box metric is computed by counting the number of samples in each of the two invalid regions, namely the region lying between 10 and 90 and the region lying between −10 and −90, respectively, of the graph of FIG. 9 (block 840). In branch 835, the tightness metric is computed by first identifying the samples lying within each valid region (block 850). The valid regions include the region above +90, the region below −90 and the region between +10 and −10. These regions encompass deviations of 10% from the allowed or valid amplitudes of 100, −100 and 0. Of course, wider regions (e.g., encompassing 15% deviations) or narrower regions (e.g., encompassing 5% deviations) may be chosen. The next step is to compute the amplitude difference between each pair of chronologically successive samples lying within the same valid region (block 860). For this purpose, a pair of samples is considered to be successive even though an intervening sample occurred but fell outside of the region. Such a sample is ignored. Once the differences between each pair of successive samples have been computed for one region, the same computation is performed for another valid region, until all valid regions have been accounted for. Next, for all valid regions, the number of differences not exceeding a threshold amount (such as 5% of the peak amplitude) is counted, the total count being the measure of tightness of the present equalizer setting (block 870). The total metric for the present delay value is then computed (block 880) by combining the whitebox metric of block 840 with the tightness metric of block 870. Preferably, this is done by subtracting the tightness metric from the whitebox metric.

If all N delay values have been evaluated, then their results are compared (block 890) to find the best delay value of the controllable delay element 232. Otherwise, the process loops back to the step of block 820.

While two different examples of methods for computing the metric have been given here, the invention is not confined to these two particular examples, and other methods may be employed in carrying out the invention.

The invention has been described with reference to embodiments in which the master has a metric processor responsive to signal resolution, and a decision processor shifts the sample time of the master with respect to the master clock signal to optimize the output of the metric processor. However, the invention may also be carried out in a more robust manner by providing the metric processor 270 with each master 115 and a metric processor 270' with each slave 120, as indicated in dashed line in FIG. 1. In such an embodiment, each master would request its slave to transmit the output of the slave's metric processor. Thus, the decision processor 285 associated with all the masters 115 could be programmed to shift the sample time to optimize both the signal resolution metric at the master (computed by the master's metric processor 270) and the signal resolution metric at the slave (computed by the slave's metric processor 270').

While the invention has been described in detail by specific reference to preferred embodiments, it is understood that variations and modifications thereof may be made without departing from the true spirit and scope of the invention.

What is claimed is:

1. Apparatus for a bi-directional communication link having a plurality of channels, each of said channels comprising:
    a master connected at a near end of the channel and a slave connected at an opposite end of the channel, said master comprising:
        (a) a first transmitter coupled to the channel and having a master Tx clock signal; and
        (b) a first receiver coupled to the channel and comprising;
            (i) an analog-to-digital (A/D) converter that periodically samples a signal incoming over the channel to yield a received signal;
            (ii) a clock recovery circuit that generates a master Rx clock from a clock signal embedded in the received signal; and
            (iii) a metric processor, connected to an output of said A/D converter, that produces a metric signal reflective of amplitude differences between the received signal and allowed amplitude levels for the received signal; and
    said slave comprising:
        (a) a second receiver coupled to the channel and comprising a clock recovery circuit for generating a Slave Rx clock from a signal received over the channel and transmitted from the master;
        (b) a second transmitter coupled to the channel and having a Slave Tx clock signal, said master Rx clock signal being frequency locked to said Slave Tx clock signal; and
        (c) a first delay element for generating said Slave Tx clock signal by controllably delaying said Slave Rx clock signal; and
    wherein said apparatus further comprises a decision processor, connected to said master and responsive to said metric signal, for determining a delay value to be provided by said first delay element in the slave which will maximize the metric signal and issuing a command, via the first transmitter and the channel, to said second receiver in order to set a delay provided by said first delay element to said delay value, so as to reduce distortion caused by near end crosstalk and echo in signals received over the channel, by the first receiver and thus facilitate clock and data recovery by the first receiver.

2. The apparatus of claim 1 further comprising, in the first receiver, a second delay element, situated between said Master Rx clock signal and said A/D converter and responsive to said decision processor, which controllably delays a sampling time, Ts, provided by said converter, wherein said decision processor independently sets the delays provided by the first and second delay elements in order to further maximize the metric signal.

3. The apparatus of claim 2 wherein the metric processor comprises a processor for computing a proportion of samples of the received signal provided by the master falling within the allowed amplitude levels relative to those of said samples that fall outside of the allowed amplitude levels.

4. The apparatus of claim 3 wherein said decision processor is connected to all the masters and is responsive to the metric signal produced in each of the masters so as to change the phase in each corresponding one of the slaves in order to maximize all the metric signals produced by all the masters.

5. The apparatus of claim 1 wherein said decision processor is connected to all the masters and is responsive to the metric signal produced in each of the masters so as to change the phase in each corresponding one of the slaves in order to maximize all the metric signals produced by all the masters.

6. The apparatus of claim 1 wherein the metric processor comprises a processor for computing a proportion of samples of the received signal provided by the master falling within the allowed amplitude levels relative to those of said samples that fall outside of the allowed amplitude levels.

7. The apparatus of claim 6 wherein said decision processor is connected to all the masters and is responsive to the metric signal produced in each of the masters so as to change the phase in each corresponding one of the slaves in order to maximize all the metric signals produced by all the masters.

8. Apparatus for a bi-directional communication link having a plurality of channels with a master and a slave at respective ends of each one of the channels so as to define respective pluralities of masters and slaves, the master issuing a Master Tx clock, the slave constructing both a Slave Rx clock frequency-locked to the Master Tx clock and a Slave Tx clock frequency-locked to the Slave Rx clock, said apparatus comprising:

a metric processor, situated within said master, which produces a metric signal reflective of amplitude differences between a signal received by the master from a corresponding one of the slaves and allowed amplitude levels of the received signal; and a decision processor, connected to the master and responsive to the metric processor, for changing phase of the Slave Tx clock relative to the Slave Rx clock in the corresponding one of the slaves in order to maximize the metric signal produced by the metric processor and thereby reduce distortion caused by near end cross-talk and echo in signals received over the channel by a receiver in the master and thus facilitate clock and data recovery by the receiver.

9. The apparatus of claim 8 wherein said metric processor comprises a processor for computing a proportion of samples of the received signal provided by each of said masters and which fall within the allowed amplitude levels relative to those ones of said samples that fall outside of the allowed amplitude levels.

10. The apparatus of claim 8 wherein said decision processor is connected to all the masters and is responsive to the metric signal produced in each of the masters so as to change the phase in each corresponding one of the slaves in order to maximize all the metric signals produced by all the masters.

11. The apparatus of claim 8 wherein said decision processor is connected to all the masters and is responsive to the metric signal produced in each of the masters so as to change the phase in each corresponding one of the slaves in order to maximize all the metric signals produced by all the masters.

\* \* \* \* \*